United States Patent Office 2,780,155
Patented Feb. 5, 1957

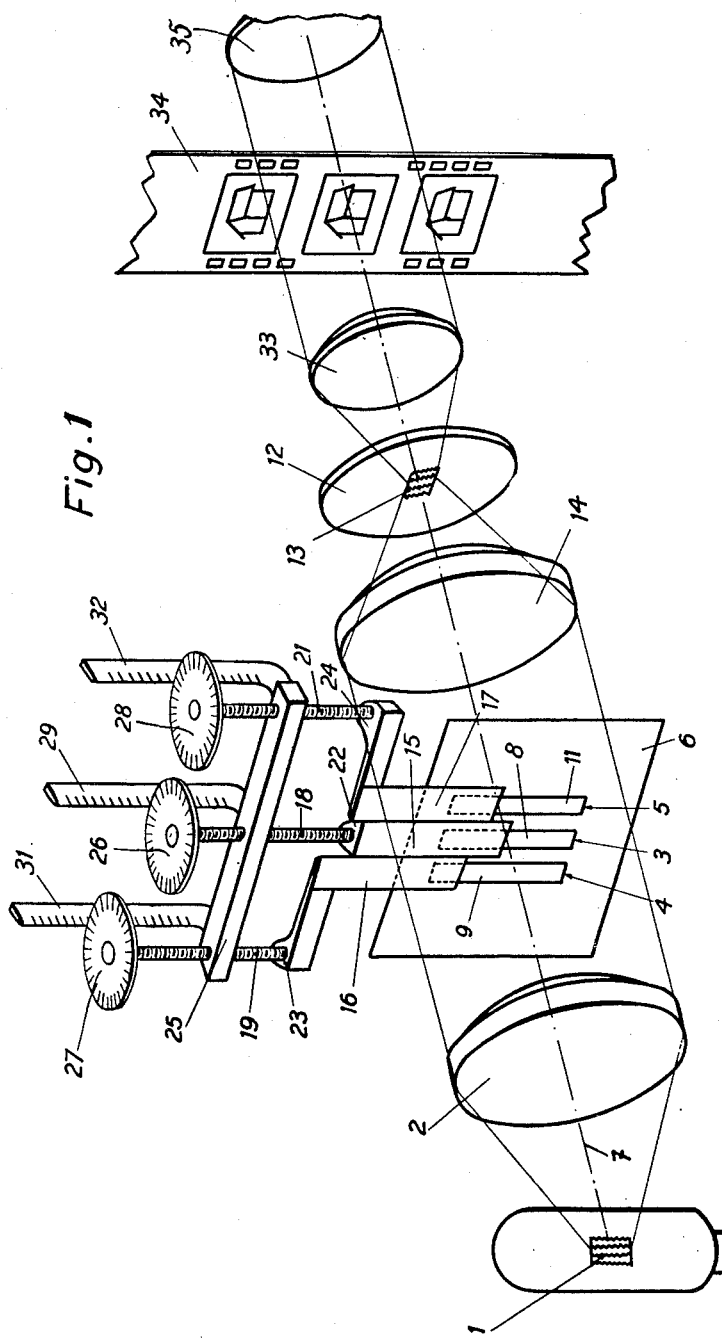

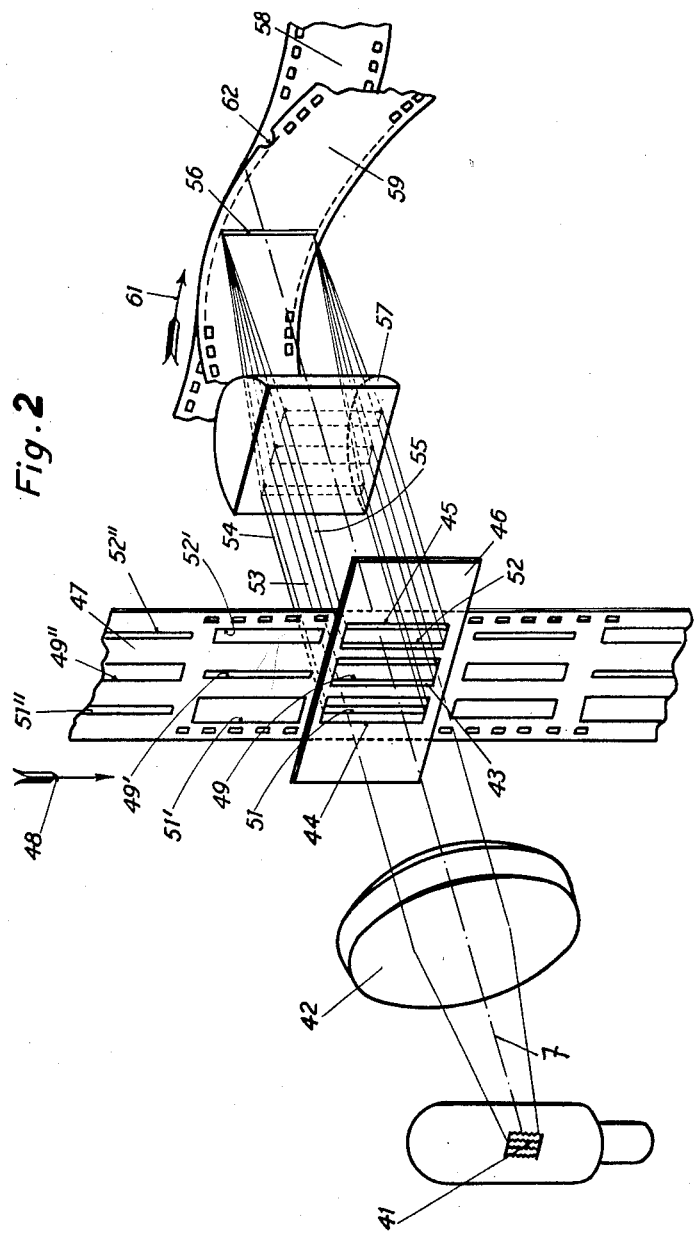

2,780,155

MEANS FOR THE CONTINUOUS PRINTING OF COLORED FILMS

André Victor Léon Clément Debrie, Paris, France

Application January 3, 1952, Serial No. 264,749

Claims priority, application France January 10, 1951

2 Claims. (Cl. 95—75)

In the reproduction of colored films by subtractive method the positives are obtained from a negative in colors of complemental colors, and a light source of determined color temperature is employed.

If the negative is perfect, as to the value of its colors, a positive of correct colors is obtained. In practice, however, this condition is never realized, on account of errors in exposure and treatment.

The positive then has complemental dominant colors of the dominants of the negative. This defect is corrected by interposing, into the beam of printing light, filters coloured with complemental color of the dominants to be eliminated.

Instead of seeking, for the positive, an absolute accuracy of the colors in respect to those of the standard, it may also be desired to improve the artistic effect by causing them to be modified voluntarily by a dominant selected with a view to obtaining such effect.

The method of correction, hitherto generally employed, is very complicated. It consists in projecting the film scene by scene and evaluating the complemental color that must be added to render satisfactory the coloring of the film.

There is selected, in a collection, the filter in gelatine that gives the desired coloring. It is fixed, by any suitable means, in the perforated band facing the film, whereafter a projection is tried. It happens seldom that the first filter gives satisfaction; it is then changed and a projection is tried again. The operation is recommenced as many times as is necessary to obtain the accurate coloring. This method takes a lot of time and care.

It has been proposed to employ holes, of varying diameters, suitable for regulating the amount of light and eccentric in respect to a filter comprising three sectors colored each with one of the elementary colors, this eccentricity simultaneously varying the relative surfaces of the three filter sectors and, consequently, the composition of the color resulting from the addition of the three fluxes, and the amount of light resulting therefrom to correct the defects of said projections and to deduce therefrom the light to be utilized for printing.

Unfortunately, the employment of eccentric holes necessitates, in order that this method may be effective, a mask-band width exceeding the width of the normal film and diameters of optical means exceeding those usually employed in present day projecting and printing apparatus. These shortcomings adversely affect price and construction of apparatus. Also, a mask-band with holes and round filters, utilizable if absolutely necessary for image-by-image printing, is unsuitable for the continuous printing.

It is an object of the present invention to provide a means which does away with these shortcomings and permits the continuous printing of a subtractive positive in colors from a subtractive negative in colors.

The method consists in printing positive films in colors, of the subtractive type, by means of a negative film in colors, of the subtractive type, being moving applied against each other or being optically projected one upon the other in a continuous printer, the negative film being illuminated by a transversal luminous strip whose intensity and quality, or color temperature, are determined for each scene during which the illumination remains steady, the processing being as follows:

Examining, scene by scene, the positive film, previously obtained from the negative film, illuminated by a determined source of white light, while illuminating this positive film with the light obtained by blending three beams of elementary monochromatic lights colored by passage of the light emitted by said source through appropriate monochromatic filters, the flux of each of said monochromatic beams being regulated by varying the surface of an aperture through which the beam of light passes; and recording the indications that correspond to the displacements of the elements controlling the variations in the surface of each aperture, at the moment when the colors are visually correct as to their intensity and quality.

With the aid of these indications, translated by appropriate means, there are set up, for every scene corresponding to the same illumination, three slots of corresponding widths such that, for a same and constant height of these three slots, the surface of each slot corresponds, in accordance with the said indications, to a value of the elementary monochromatic luminous flux which becomes superposed upon the monochromatic luminous fluxes of the other two slots and yields a luminous flux of desired intensity and quality for corrected and correct printing of each scene; the slots, thus set up, succeed one another per group of three on a mask-band and are illuminated by means of a common white light, the latter being filtered, to be rendered monochromatic, by the color corresponding to each of the three slots.

Each rectangular beam, of variable width and of height equal to that of the other two beams, is then focused upon the negative film by a cylindric lens whose generating lines are parallel to the height of said slots and perpendicular to the displacement of the two films in this region of the printer; the three monochromatic luminous fluxes thus yield three very narrow bands which cover one another at least partly and yield, by addition of their elementary amounts of light, the quantitative and qualitative illumination suitable for corrected and correct printing of the positive film, the mask-band being advanced in known way between each two consecutive scenes to present the slots suitable for the correct printing of the passing scene.

It results from the foregoing that the processing is executed in two steps: first, examining the film for printing light with the aid of appropriate means, and then printing proper with aid of means ensuring the linear concentration of the elementary monochromatic luminous fluxes standing, for example in a continuous contact printer, instead of the slot illuminated by the white light hitherto usually employed.

It is a further object of the present invention to provide means suitable for carrying out the above method, said means being schematically illustrated, by way of example, in the accompanying drawings in which Fig. 1 is a schematic perspective showing of a device for examining a positive film for correcting the printing light; and Fig. 2 is a schematic perspective showing of a device for illuminating, with the light corrected in function of the indications obtained by means of the device of Fig. 1, the raw film through the negative film in a continuous contact printer.

Referring to Fig. 1, it will be seen that a source of white light 1, of determined color temperature, uniformly illuminates, through a collimator 2 of convenient dimensions, three rectangular apertures 3, 4, 5 identical with one another and formed in an opaque screen 6 perpendicular to the optical axis 7. These three apertures have their heights, vertical for example, greater than their widths, and are separated from one another by portions of the screen 6.

Each of these apertures is covered by a filter colored with one of the elementary pure colors.

These filters, colored for example with the red 8 in 3, green 9 in 4 and yellow 11 in 5, yield, when the equal surfaces of 3, 4 and 5 are wholly traversed by the light coming from the source 1, three beams of light whose superposed fluxes reconstitute, by addition, the white light emitted by the source 1, upon a white diffusing surface, such as the ground glass 12, upon which they are superposed and concentrated into a spot 13 by a converging system schematically shown at 14.

Against the apertures 3, 4, 5 are arranged three shutters 15, 16, 17, respectively, each of which is displaceable, for example longitudinally, upon the corresponding aperture so as to permit of varying the surface of the latter utilized by the respective colored light beam.

These variations are manually controlled by means of screws 18, 19, 21 in screwed relationship to abutments 22, 23, 24 secured to the shutters of 3, 4 and 5, respectively. These screws are screwed longitudinally through a stationary part 25. Each screw is rotatable with the aid of indicating means operated in function of displacements of the corresponding shutter that modifies the section of the respective light beam passing through the controlled aperture.

Said indicating means will be for example the heads 26, 27, 28 of said screws provided with graduations, indicating parts of revolutions, and displaceable in front of standards 29, 31, 32, respectively, provided with graduations indicating complete revolutions.

It is clear that the action upon each screw-head will modify the elementary colored flux through the corresponding aperture and hence the composition of the colored mixture forming the spot 13 whose quality of light and, at the same time, luminous intensity will thus be regulated.

This spot 13, thus formed, is taken as source of light to illuminate, for example through a collimating lens 33, a positive film 34 obtained by means of a negative film whose illumination is intended to be corrected on the printer so as to obtain a positive free from its defects.

The film 34 is observed for example through a lens 35.

The action upon the screw-heads 26, 27, 28 causes the shutters 15, 16, 17 to regulate the obturation of the colored windows 8, 9, 11 and consequently the luminous fluxes blended at 13.

The color temperature of 13 is so selected as to ensure the best viewing of the colored film 34.

The positions then indicated by the screw-heads 26, 27, 28 and their standards 29, 31, 32 are recorded.

Deduced therefrom are the values to be imparted to the sections of the elementary colored fluxes in the pertaining printer of which only the elements within the scope of the invention are schematically shown in Fig. 2 and described hereinafter.

A light source 41, of same light temperature as lamp 1', illuminates through a collimator 42 equally high and wide apertures 43, 44, 45 made in a screen 46 and provided with colored filters corresponding to the aforesaid filters.

Displaceable against the screen 46 is a mask-band 47 upon which there are arranged, for example along three lines in the direction of displacement 48 of this band, series of three transparent windows 49, 51, 52 whose height is regulated by the height of the apertures 43, 44, 45 in the screen 46 and whose width, varying from one series such as 49', 51', 52' to another such as 49'', 51'', 52'', is established, in accordance with the recorded indications effected in each scene, to regulate the rectangular sections of the coloured light beams, controlled by said maskband, and thus to reconstitute, by addition of the fluxes, a light of the colour temperature corresponding to the desired printing.

The light beams of elementary colors 53, 54, 55 are concentrated, by means of a cylindric lens 57, into a fine strip 56 composed, by at least partial superposition, of the image of each colored window.

The strip of corrected light 56 illuminates the raw film 58 through the negative in colors 59 in the region where the two films contact each other and are moved in the direction of the arrow 61.

The height of windows 43, 44, 45 and the generating lines of said cylindric lens 57 are parallel to one another and perpendicular to 61.

The strip 56 uniting, in corrected proportions, the elementary colored fluxes permits the continuous corrected printing of said film in colors. Of course, the change in form of the transparent windows 49, 51, 52, replaced for example by 49', 51', 52', is effected between the corresponding scenes by causing, at the desired instant, the mask-band 47 to advance abruptly under the action of a dog (not shown) adapted to engage into a notch 62 of the negative film 59.

It is to be understood that the invention is not limited to the particular forms of apparatus shown and described, as the same may be modified in various particulars without departing from the scope of the invention.

What is claimed is:

1. A device for illuminating a positive film through a colored negative in a continuous contact printer comprising, in combination, a source of white light, an opaque screen interposed in the path of said light between said source and said colored negative, said opaque screen being formed with three adjacent rectangular windows, each of said windows being covered by a different monochromatic filter, a continuous perforated strip displaceable across said windows, said perforated strip being formed with a plurality of vertically-spaced sets of three transversely spaced apertures of varying sizes in fixed relationship to limit the open area of each of said windows, said strip being effective for selectively varying the open area of said windows and thereby varying the composition of the monochromatic light beams issuing from each of said windows by passage of said white light through said filters in the open area of said windows, and means for optically concentrating the beams of monochromatic light issuing from said windows in a single strip of light on said colored negative, said means for concentrating the beams of monochromatic light comprising a semicylindrical lens, the lines describing said lens being perpendicular to the direction of displacement of said colored negative but parallel to the surface thereof at the point of impingement of said light.

2. A device for illuminating a positive film through a colored negative in a continuous contact printer comprising, in combination, a source of white light, an opaque screen interposed in the path of said light between said source and said colored negative, said opaque screen being formed with three adjacent rectangular windows, each of said windows being covered by a different monochromatic filter, a continuous perforated strip displaceable across said windows, said perforated strip being formed with a plurality of vertically-spaced sets of three transversely spaced apertures of varying sizes in fixed relationship to limit the open area of each of said windows, said strip being effective for selectively varying the open area of said windows and thereby varying the composition of the monochromatic light beams issuing from each of said windows by passage of said white light through said filters in the open area of said windows, and means for optically concentrating the beams of monochromatic light issuing from said windows in a single strip of light on said colored negative, said means for concentrating the beams of monochromatic light comprising a semi-cylindrical lens, the lines describing said lens being parallel to said opaque screen.

References Cited in the file of this patent

UNITED STATES PATENTS

| | | |
|---|---|---|
| 1,676,600 | Capstaff | July 10, 1928 |
| 1,783,998 | Chretien | Dec. 9, 1930 |
| 1,944,230 | Gregory | Jan. 23, 1934 |
| 2,117,727 | Jones | May 17, 1938 |
| 2,122,689 | Jones | July 5, 1938 |
| 2,269,161 | Morse | Jan. 6, 1942 |
| 2,330,877 | Fleischer | Oct. 5, 1943 |
| 2,354,108 | Fleming | July 18, 1944 |
| 2,466,154 | Conklin | Apr. 5, 1949 |
| 2,672,799 | Terwilliger | Mar. 23, 1954 |

FOREIGN PATENTS

| | | |
|---|---|---|
| 129,747 | Great Britain | July 24, 1919 |
| 341,078 | Great Britain | Jan. 7, 1931 |
| 409,287 | Great Britain | Apr. 23, 1934 |
| 630,853 | Great Britain | Oct. 24, 1949 |

OTHER REFERENCES

Fiat: Final Report 721 "The Agfacolor Negative-Positive Method for Professional Motion Pictures," pages 12 and 13, January 30, 1946.